US012096133B2

(12) United States Patent
Nakahara et al.

(10) Patent No.: US 12,096,133 B2
(45) Date of Patent: Sep. 17, 2024

(54) CAMERA SYSTEM, VEHICLE, CONTROL METHOD, AND STORAGE MEDIUM

(71) Applicant: CANON KABUSHIKI KAISHA, Tokyo (JP)

(72) Inventors: Ikunari Nakahara, Kanagawa (JP); Tomoaki Tsuchiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 17/942,291

(22) Filed: Sep. 12, 2022

(65) Prior Publication Data

US 2023/0097715 A1    Mar. 30, 2023

(30) Foreign Application Priority Data

Sep. 24, 2021  (JP) ................................ 2021-155237

(51) Int. Cl.
*H04N 23/951*  (2023.01)
*B60R 1/26*  (2022.01)

(52) U.S. Cl.
CPC ............ *H04N 23/951* (2023.01); *B60R 1/26* (2022.01); *B60R 2300/302* (2013.01); *B60R 2300/8066* (2013.01)

(58) Field of Classification Search
CPC .... H04N 23/951; H04N 5/2628; H04N 5/265; B60R 1/26; B60R 2300/302; B60R 2300/8066; B60R 2300/30; B60R 2300/70

See application file for complete search history.

(56) References Cited

U.S. PATENT DOCUMENTS

| 10,447,948 | B2 | 10/2019 | Aihara | |
|---|---|---|---|---|
| 2004/0085447 | A1* | 5/2004 | Katta | H04N 7/181 348/E7.086 |
| 2018/0332243 | A1* | 11/2018 | Aihara | G06T 3/04 |
| 2019/0188504 | A1* | 6/2019 | Aihara | G06V 10/25 |
| 2019/0273889 | A1* | 9/2019 | Aihara | B60R 1/28 |

(Continued)

FOREIGN PATENT DOCUMENTS

| CN | 111907409 A | 11/2020 |
|---|---|---|
| JP | H11-348659 A | 12/1999 |
| JP | 2004-345554 A | 12/2004 |

(Continued)

OTHER PUBLICATIONS

May 7, 2024 Japanese Official Action in Japanese Patent Appln. No. 2021-155237.

*Primary Examiner* — Christopher K Peterson
(74) *Attorney, Agent, or Firm* — Venable LLP (57) ABSTRACT

In a camera system, a captured image of a rear of a vehicle is acquired, an optical image having a high-resolution region and a low-resolution region is formed on an imaging unit, a first image is generated by cutting out a first region from an image region corresponding to the high-resolution region in an image read from the imaging unit, a second image is generated by cutting out a second region from an image region different from the first region, the first image and the second image are generated such that at least a portion of a lower end of the second region is positioned below a lower end of the first region, and at least a portion of an upper end of the second region is positioned below an upper end of the first region, and at least one of the first image and the second image is output for display.

16 Claims, 5 Drawing Sheets

(56) References Cited

U.S. PATENT DOCUMENTS

2021/0291738 A1\* 9/2021 Lang .................... B60R 1/12

FOREIGN PATENT DOCUMENTS

| JP | 2010-095202 A | 4/2010 |
| --- | --- | --- |
| JP | 2010-134803 A | 6/2010 |
| JP | 2020-170341 A | 10/2020 |
| WO | 2018/207393 A1 | 11/2018 |

\* cited by examiner

CAMERA SYSTEM, VEHICLE, CONTROL METHOD, AND STORAGE MEDIUM

BACKGROUND OF THE INVENTION

Field of the Invention

The present invention relates to a camera system capable of acquiring images having different resolutions, a vehicle, a control method, and a storage medium.

Description of the Related Art

In recent years, there has been a demand to replace a rear-view mirror mounted on a vehicle with an electronic rear-view mirror. Japanese Patent Application Laid-Open No. 2010-95202 discloses an electronic rear-view mirror system which is constituted by an imaging unit that sets a rear side outside a vehicle as an imaging range and display means inside the vehicle, and the electronic rear-view mirror system displaying an image captured by the imaging unit on a display inside the vehicle so that a driver can confirm the state of the rear side outside the vehicle.

On the other hand, there is a rearward confirmation system that allows a driver to confirm a blind spot behind a vehicle when the vehicle moves back, or the like. Japanese Patent Application Laid-Open No. 2004-345554 discloses a rearward confirmation system in which a camera is installed to image a side behind a vehicle, and a captured image is displayed inside the vehicle, so that a driver can confirm a blind spot behind the vehicle when the vehicle moves back, or the like.

A camera serving as an imaging unit that captures an image for the above-mentioned electronic rear-view mirror is required to have a high resolution so that a driver can confirm a relatively distant rear view more accurately. On the other hand, the camera for the rearward confirmation system confirms safety in a wider range including a blind spot behind the vehicle and a rear side in order to avoid a collision when the vehicle moves back, or the like, and thus the camera is required to image a larger range.

Thus, in a case where the electronic rear-view mirror system and the rearward confirmation system are mounted on a vehicle at the same time, there is a problem that an in-vehicle camera system becomes complicated when the camera for the electronic rear-view mirror system and the camera for the rearward confirmation system are separately mounted.

Thus, in view of the above-mentioned problem, an object of the present invention is to provide a camera system capable of generating a high-resolution first image and a low-resolution second image by one imaging unit, the low-resolution second image being an image in which a lower side can be displayed in a wide range.

SUMMARY OF THE INVENTION

In order to achieve the above-mentioned object, a camera system according to an aspect of the present invention includes
an imaging unit that acquires a captured image of a rear of a vehicle;
an optical system that forms an optical image having a high-resolution region and a low-resolution region on the imaging unit;
at least one processor or circuit configured to function as:
an image generation unit configured to generate a first image by cutting out a first region from an image region corresponding to the high-resolution region in an image data read from the imaging unit and generate a second image by cutting out a second region from an image region different from the first region; and
an output unit configured to output at least one of the first image and the second image for display,
wherein the image generation unit generates the first image and the second image so that at least a portion of a lower end of the second region is positioned below a lower end of the first region, and at least a portion of an upper end of the second region is positioned below an upper end of the first region.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
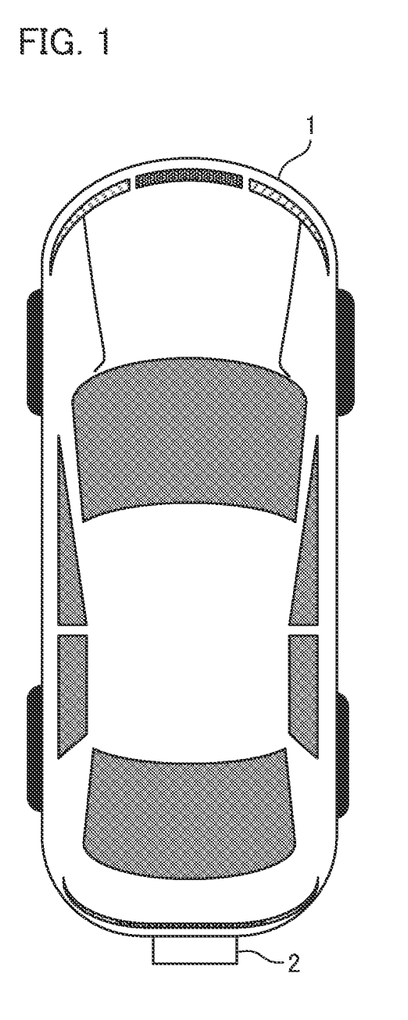
FIG. 1 is a diagram illustrating a positional relationship between a vehicle 1 and an imaging unit 2.

In a first embodiment, description will be given of an improved method that achieves both a high-definition display for an electronic rear-view mirror and a wide-range display for confirming a rear side by one camera. FIG. 1 is a diagram illustrating a positional relationship between a vehicle 1 and an imaging unit 2.

In the first embodiment, as illustrated in FIG. 1, the imaging unit 2 is installed at the rear of the vehicle 1, for example, an automobile. The imaging unit 2 is installed such that the rear of the vehicle is set to be an imaging range. The imaging unit 2 includes an optical system that forms an optical image, and a sensor for capturing an optical image formed by the optical system on a light receiving unit of the imaging unit 2. It is preferable that the imaging unit be installed so that an optical axis of the optical system included in the imaging unit 2 is substantially horizontal.

Further, the imaging unit 2 used in the first embodiment includes an optical system having a sufficient angle of view and an imaging magnification in a center angle-of-view region in order to obtain a captured image of a distant location at high definition and a wide angle of view. The optical system included in the imaging unit 2 in the first embodiment will be described with reference to FIG. 2.

Figure 2A:
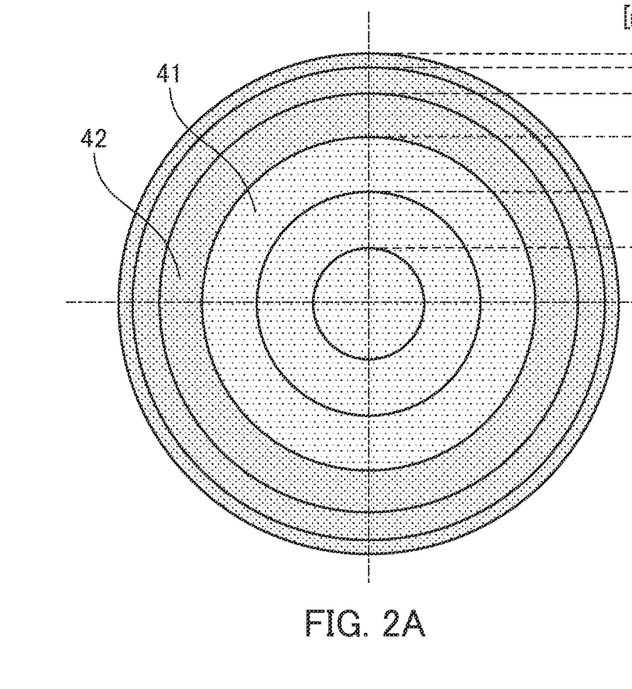
FIGS. 2(A) and 2(B) are diagrams illustrating optical characteristics of the imaging unit 2.
Figure 2B:
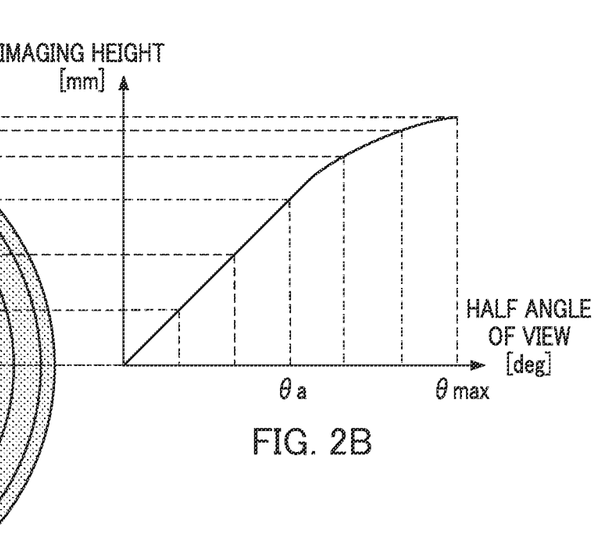

FIGS. 2(A) and 2(B) are diagrams illustrating optical characteristics of the imaging unit 2, and FIG. 2(A) is a diagram in which an image height y at each half angle of view on a sensor surface of the imaging unit 2 in the optical system included in the imaging unit 2 in the first embodiment is shown in a contour line shape.

FIG. 2(B) is a diagram illustrating projection characteristics showing a relationship between an image height y and a half angle of view θ of the optical system included in the imaging unit 2 in the first embodiment. In FIG. 2(B), the half angle of view (an angle formed by an optical axis and an incident light beam) θ is shown as a horizontal axis, and an imaging height (image height) y on the sensor surface (image surface) of the imaging unit 2 is shown as a vertical axis.

As illustrated in FIG. 2(B), the optical system included in the imaging unit 2 in the first embodiment is configured such that a projection characteristic y(θ) differs between a region having less than a predetermined half angle of view θa and a region having a half angle of view θa or more. Thus, when the amount of increase in the image height y with respect to the half angle of view θ per unit is set to be a resolution, the resolution differs depending on a region.

It can also be said that this local resolution is expressed by a differential value dy(θ)/dθ at the half angle of view θ of the projection characteristic y(θ). That is, it can be said that the larger an inclination of the projection characteristic y(θ) in FIG. 2(B), the higher the resolution. Further, it can also be said that the larger an interval of the image height y at each half angle of view having a contour line shape in FIG. 2(A), the higher the resolution.

In the first embodiment, a region close to the center which is formed on the sensor surface when the half angle of view θ is less than the predetermined half angle of view θa is referred to as a high-resolution region 41 (FIG. 2(A)), and a region close to the outside in which the half angle of view θ is equal to or larger than the predetermined half angle of view θa is referred to as a low-resolution region 42 (FIG. 2(A)).

The optical system included in the imaging unit 2 in the first embodiment is configured such that the projection characteristic y(θ) thereof is larger than f×θ in the high-resolution region 41 (f is a focal length of the optical system included in the imaging unit 2). In addition, the projection characteristic y(θ) in the high-resolution region is set to be different from the projection characteristic in the low-resolution region.

Further, when θ max is a maximum half angle of view of the optical system included in the imaging unit 2, it is preferable that a ratio θa/θ max between θa and θ max be equal to or greater than a predetermined lower limit value, and for example, 0.15 to 0.16 is preferable as the predetermined lower limit value.

Further, it is preferable that the ratio θa/θ max between θa and θ max be equal to or less than a predetermined upper limit value, which is preferably 0.25 to 0.35, for example. For example, in a case where θ max is set to 90 degrees, the predetermined lower limit is set to 0.15, and the predetermined upper limit is set to 0.35, it is preferable that θa be determined in the range of 13.5 to 31.5 degrees.

Further, the optical system included in the imaging unit 2 is configured such that the projection characteristic y(θ) thereof also satisfies the following Equation 1.

$$1 < \frac{f \times \sin\theta_{max}}{y(\theta_{max})} \leq A$$

As described above, f is a focal length of the optical system included in the imaging unit 2, and A is a predetermined constant. A center resolution can be made higher than that of a fisheye lens in an orthographic projection method (y=f×sin θ) having the same maximum imaging height by setting the lower limit value to 1, and good optical performance can be maintained while obtaining an angle of view equivalent to that of a fisheye lens by setting the upper limit value to A.

The predetermined constant A may be determined in consideration of the balance of a resolution between the high-resolution region and the low-resolution region and is preferably set to 1.4 to 1.9.

By configuring the optical system as described above, a resolution can be obtained in the high-resolution region 41, while it is possible to reduce the amount of increase in an image height y with respect to a half angle of view θ per unit and capture a wider angle of view in the low-resolution region 42. Thus, it is possible to obtain a high resolution in the high-resolution region 41 while setting an imaging range to a wide angle of view equivalent to that of a fisheye lens.

Further, in the first embodiment, since the high-resolution region is set to have characteristics close to a central projection method (y=f×tan θ) and an equidistant projection method (y=f×θ), which are projection characteristics of a normal optical system for imaging, an optical distortion is small, and it is possible to perform display with high definition. Thus, natural depth perception can be obtained when visually observing nearby vehicles such as a preceding vehicle and a following vehicle, and good visibility can be obtained by suppressing deterioration of image quality.

Note that the same effect can be obtained as long as a projection characteristic y(θ) satisfies the condition of the above-mentioned Equation 1, and thus the present invention is not limited to the projection characteristic illustrated in FIG. 2.

Figure 3:
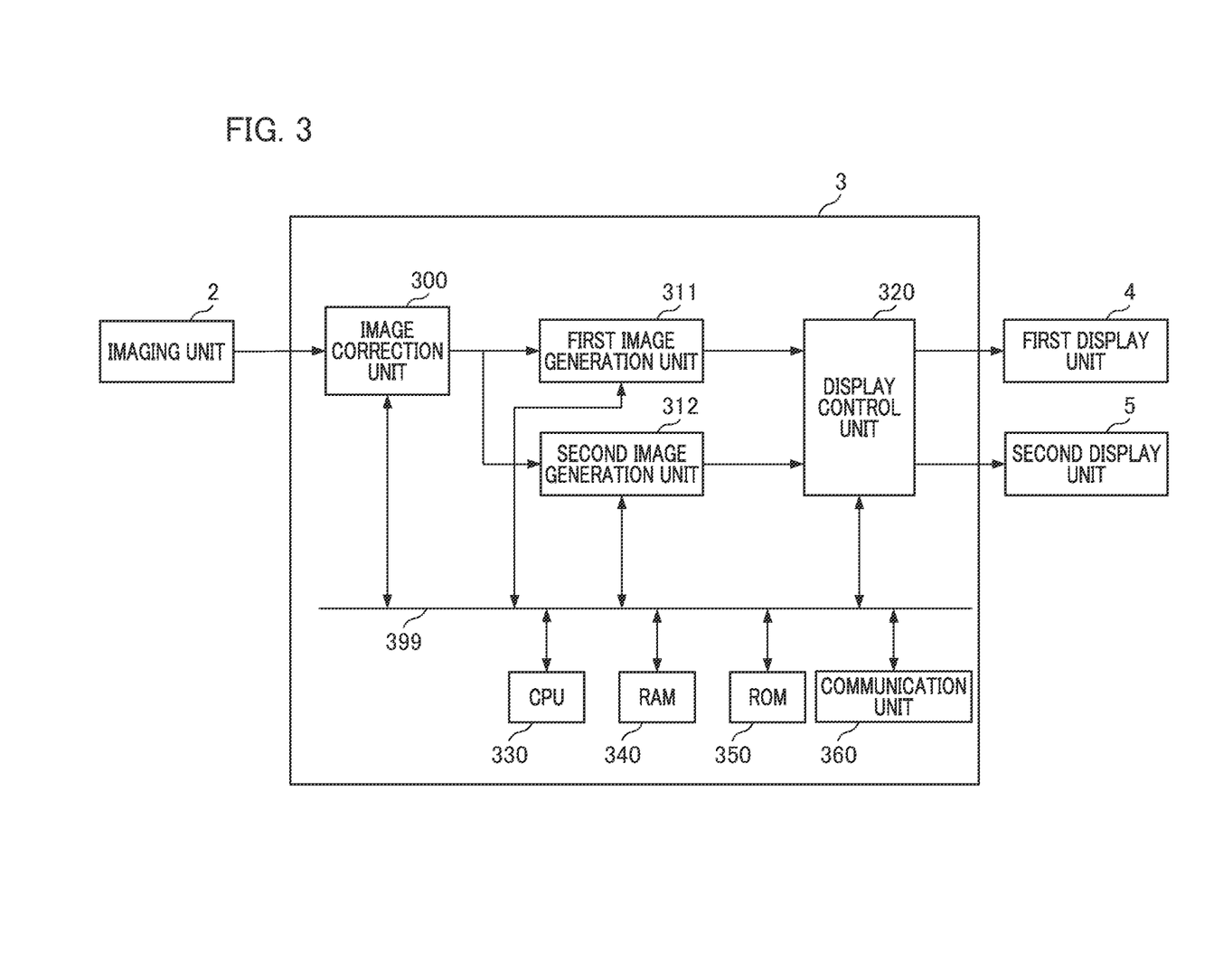
FIG. 3 is a block diagram illustrating a configuration of a camera system in a first embodiment.

Next, a configuration of the camera system in the first embodiment will be described with reference to FIG. 3. FIG. 3 is a block diagram illustrating a configuration of the camera system in the first embodiment. The camera system in the first embodiment includes an imaging unit 2, an image processing unit 3, a first display unit 4, a second display unit 5, and the like.

The imaging unit 2 is constituted by an optical system, a sensor, an image output interface, and the like. The optical system is constituted by one or more optical lenses, is configured to satisfy the condition of Equation 1, and is configured to have characteristics illustrated in, for example, FIG. 2.

Light that has passed through the optical system is imaged on the light receiving surface of the sensor. The sensor converts the received light into an electric signal and outputs the electric signal as image data. As the sensor, a CMOS image sensor or a CCD image sensor can be used. The image data output from the sensor is output to the image processing unit 3 via an image output interface.

The image processing unit 3 includes an image correction unit 300, a first image generation unit 311, a second image generation unit 312, a display control unit 320, a CPU 330, a RAM 340, a ROM 350, a communication unit 360, and the like. The image correction unit 300, the first image generation unit 311, the second image generation unit 312, the display control unit 320, the CPU 330, the RAM 340, the ROM 350, and the communication unit 360 are connected to each other by a bus 399.

The CPU 330 is a computer that controls each operation block of the image processing unit 3, and the ROM 350 is a storage medium that stores a computer program for control describing a processing procedure of the CPU 330. The RAM 340 is a work memory that temporarily stores computer programs and data for control.

Note that some or all of the functional blocks such as 300, 311, 312, and 320 illustrated in FIG. 3 may be realized by hardware, or may be realized by causing the CPU 330 to execute a computer program stored in the ROM 350. As the hardware, a dedicated circuit (ASIC), a processor (a reconfigurable processor, a DSP), or the like can be used.

The communication unit 360 communicates with other devices mounted in the vehicle 1, such as a navigation system and a vehicle control device that controls the driving of the vehicle, using protocols such as CAN, FlexRay, and Ethernet.

The image correction unit 300 performs image processing such as development processing and color adjustment on image data input from the imaging unit 2 and outputs the input image data to the first image generation unit 311 and the second image generation unit 312. More specifically, image data input from the imaging unit 2 in a Bayer array is Debayer-processed and converted into RGB image data in a raster format. Furthermore, a variety of correction processing operations such as white balance adjustment, gain/offset adjustment, gamma processing, and color matrix processing is also performed.

Note that a configuration may also be adopted in which some or all of the processing operations performed by the image correction unit 300 in the first embodiment are performed by the imaging unit 2 by providing an image processing LSI or the like in the imaging unit 2. Alternatively, some image processing may be performed by a logic circuit laminated in the sensor of the imaging unit 2.

The first image generation unit 311 and the second image generation unit 312 respectively cut out predetermined regions from image data input from the image correction unit 300 to generate and output a first image and a second image. Note that the cut-out regions are configured to be capable of being individually set by the first image generation unit 311 and the second image generation unit 312. Details of regions to be cut out by the first image generation unit 311 and the second image generation unit 312 will be described later.

The display control unit 320 outputs at least one of the first image and the second image, which are cut-out image data respectively input from the first image generation unit 311 and the second image generation unit 312, for display. Further, it is controlled on which of the first display unit 4 or the second display unit 5 the image data is to be displayed.

Further, in a case where display resolutions and display frequencies of the first display unit 4 and the second display unit 5 are different from those of the cut-out image data, the image data is output after the display resolution and display frequency are converted to match each of the display units.

Here, the display control unit 320 functions as an output unit that outputs at least one of the first image and the second image for display. Further, the first display unit 4 and the second display unit 5 function as display units that display at least one of the first image and the second image output from the output unit.

Note that, in the example of FIG. 3, the first display unit 4 and the second display unit 5 as display units have different configurations, but may use a common display screen.

Further, it is also possible to apply predetermined geometric deformation processing (for example, distortion correction) to each of pieces of cut-out image data. In addition, instead of outputting each of the pieces of cut-out image data, it is also possible to output a map image of a car navigation system acquired via the communication unit 36) and a CG image for a user interface for air conditioning, sound, and vehicle control.

The first display unit 4 is a display that performs display based on input image data, and is installed so that a display screen faces the rear of the vehicle, for example, in the vicinity of the center of the front upper portion of the driver's seat in the vehicle width direction of the vehicle 1. Note that a configuration in which the first display unit can be used as a mirror by using a half mirror or the like when it is not used as a display may be used.

Further, the first display unit 4 may be configured to include a touch panel or an operation button to acquire a user's instruction and to be able to output the instruction to the image processing unit 3.

The second display unit 5 is a display that performs display based on input image data, and is installed, for example, around an operation panel near the center in the vehicle width direction in front of the driver's seat. Note that the vehicle is equipped with a navigation system (not illustrated), an audio system, a vehicle control device (an engine or a motor) that controls the driving of the vehicle, and the like.

Then, for example, the second display unit can also display a navigation system, a control UI image for controlling an audio system or a vehicle control device, and the like. In addition, the second display unit is equipped with a touch panel and configured to be able to acquire a user's instruction.

Note that, as the display panels of the first display unit 4 and the second display unit 5, a liquid crystal display, an organic EL display, or the like can be used.

Next, a region to be cut out by the first image generation unit 311 and the second image generation unit 312 of the image processing unit 3 will be described using FIG. 4.

FIGS. 4(A) to 4(D) are diagrams illustrating an example of a cut-out region in the first embodiment, reference numeral 41 denotes a high-resolution region which is a region having an angle of view less than a predetermined half angle of view θa, and reference numeral 42 denotes a low-resolution region which is a region having a predetermined half angle of view θa or more.

The first image generation unit 311 in the first embodiment generates a first image by cutting out a first region from an image region corresponding to the high-resolution region 41 in an image read from an imaging element. That is, in FIG. 4, the CPU 330 performs control so as to cut out an electronic rear-view mirror image region 43 as a first region which is an image region surrounded by a solid line and to generate and output a first image.

Further, the CPU 330 controls the display control unit 320 so that the image data of the first image generated by the first image generation unit 311 is displayed on the first display unit 4.

Further, the second image generation unit 312 generates a second image by cutting out a second region from an image region different from the first region in the image read from the imaging element. That is, the CPU 330 performs control so as to cut out, for example, a rear-view monitor image region 44 as a second region which is an image region surrounded by a dashed line in FIG. 4(A) to generate and output a second image.

Figure 4A:
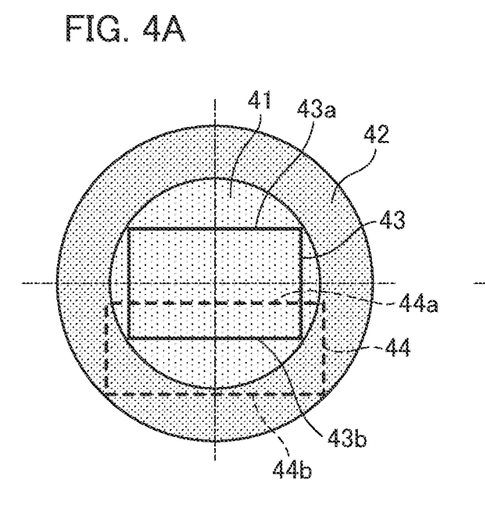
FIGS. 4A to 4D are diagrams illustrating an example of a cut-out region in the first embodiment.

At this time, the CPU 330 determines an upper end (upper side) 44*a* of the rear-view monitor image region 44 and an upper end (upper side) 43*a* of the electronic rear-view mirror image region 43 so that the upper end (upper side) 44*a* of the rear-view monitor image region 44 is positioned below the upper end (upper side) 43*a* of the electronic rear-view mirror image region 43.

Further, the CPU 330 determines a lower end (lower side) 44*b* of the rear-view monitor image region 44 and a lower end (lower side) 43*b* of the electronic rear-view mirror image region 43 so that the lower end (lower side) 44*b* of the rear-view monitor image region 44 is positioned below the lower end (lower side) 43*b* of the electronic rear-view mirror image region 43.

That is, in the example of FIG. 4(A), the image generation unit generates the first image and the second image so that the entire lower end of the second region is positioned below the lower end of the first region, and the entire upper end of the second region is positioned below the upper end of the first region.

Then, the CPU 330 controls the display control unit 320 so that image data generated by the first image generation unit 311 is displayed on the first display unit 4, and image data generated by the second image generation unit 312 is displayed on the second display unit 5.

As a result, the first image obtained by cutting out the electronic rear-view mirror image region 43 from the image data captured by the imaging unit 2 is displayed on the first display unit 4, and the second image obtained by cutting out the rear-view monitor image region 44 is displayed on the second display unit 5.

In the first embodiment, the high-resolution region 41 is configured to have a projection characteristic close to a central projection method (y=f×tan θ) and an equidistant projection method (y=f×θ) of a normal optical system for imaging, as described above.

Thus, the image for the electronic rear-view mirror displayed on the first display unit 4 has a higher resolution than the low-resolution region 42, and can display the rear of the vehicle with higher definition.

Further, since the high-resolution region 41 has a small optical distortion, the image for the electronic rear-view mirror can be displayed in a state where a distortion is small, and a driver can visually recognize the rear of the vehicle with a more natural depth perception. In addition, it is possible to improve the accuracy of image recognition at the time of performing image recognition of a license plate, a person, or the like of a vehicle behind.

On the other hand, since the lower end 44*b* of the rear-view monitor image region 44 is set to be positioned below the lower end 43*b* of the electronic rear-view mirror image region 43, a rear part of the vehicle 1 and an area near the ground which is a blind spot for the driver can be displayed and confirmed in a wider range when the vehicle 1 backs up.

This is because, in the low-resolution region 42, parameters of the optical system of the imaging unit 2 are set to reduce the amount of increase in the image height y with respect to the half angle of view θ per unit and to be able to image a wider angle of view.

Further, as described above, the upper end 44*a* of the rear-view monitor image region 44 is set to be positioned below the upper end 43*a* of the electronic rear-view mirror image region 43. Thus, compared to a case where the upper end 44*a* of the rear-view monitor image region 44 is set to be positioned above the upper end 43*a* of the electronic rear-view mirror image region 43, a case where a captured image is displayed as it is as a rear-view monitor image, or the like, an area near the ground can be displayed in a larger size with higher definition, which enables safer driving.

Further, in a case where an image having an angle of view equivalent to that of the electronic rear-view mirror image region 43 in the first embodiment is cut out by using a fisheye lens or the like having the same maximum angle of view as that of the optical system of the imaging unit 2 in the first embodiment, optical distortion is large, and thus geometric deformation processing for correcting optical distortion is required.

The geometric deformation processing mentioned here refers to processing for correcting distortion of an image by enlarging and reducing regions of an image differently at the time of display.

On the other hand, since the high-resolution region 41 of the imaging unit 2 in the first embodiment is configured to reduce optical distortion, an effect that it is possible to make the geometric deformation processing for correcting the optical distortion unnecessary and reduce a processing load is obtained.

That is, it is not necessary to perform geometric deformation processing on the first image. On the other hand, the second image may be subjected to geometric deformation processing and output from the output unit.

As described above, according to the first embodiment, by operating each part of the imaging unit 2, the image processing unit 3, the first display unit 4, and the second display unit 5, it is possible to acquire a high-definition and less distorted display for the electronic rear-view mirror and a wide-range display for confirming a rear side by one camera.

Note that, in the example of FIG. 4(A), a case where both the electronic rear-view mirror image region 43 and the rear-view monitor image region 44 are cut out in a rectangular shape has been described as an example.

Figure 4B:
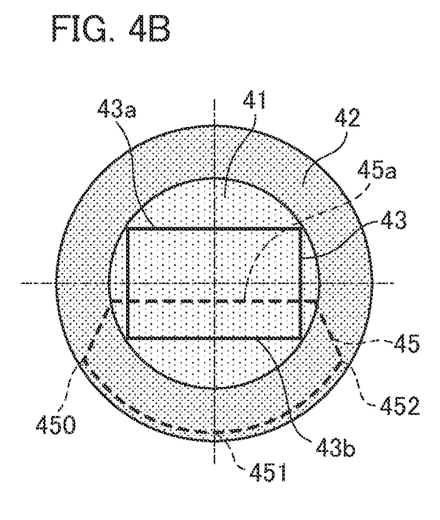

However, it is only required that the upper end 44*a* and the lower end 44*b* of the rear-view monitor image region 44 are determined to be positioned below the upper end 43*a* and the lower end 43*b* of the electronic rear-view mirror image region 43, respectively, and a cut-out shape is not limited to a rectangular shape. For example, as illustrated in FIG. 4(B), a portion of a cut-out shape of a rear-view monitor image region 45 may be a curved line.

In this case, a boundary of a region is determined so that a lower end (lower sides 450 to 452) of the rear-view monitor image region 45 is positioned below by the lower end (lower side) 43*b* of the electronic rear-view mirror image region 43 and its extension line.

That is, here, it is assumed that the vertical direction is set to be a y-coordinate axis, and a y-coordinate value increases in an upward direction. In this case, the boundary of the region is determined such that the y-coordinate of the lower end (lower sides 450 to 452) of the rear-view monitor image region 45 is smaller than the y-coordinate of the lower end (lower side) 43*b* of the electronic rear-view mirror image region 43.

By forming the lower end (lower sides 450 to 452) of the rear-view monitor image region 45 in a curved shape in this manner, it is possible to display an area near the ground closer to the vehicle than in the case of FIG. 4(A) and to perform a wider-range display for confirming a rear side.

Figure 4C:
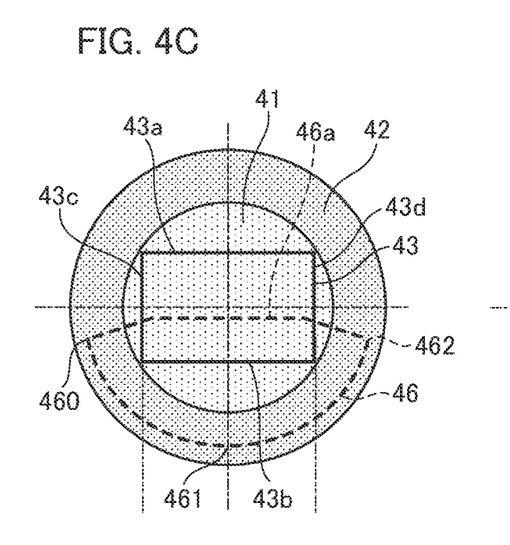

Further, in a case where a right-left direction in the display for the rear-view monitor is desired to be displayed in a wider range, it is only required that the electronic rear-view mirror image region 43 and a rear-view monitor image region 46 are individually set, for example as illustrated in FIG. 4(C).

In this case, a lower end (both ends 460 and 462) of the rear-view monitor image region 46, which is positioned outside the extension lines (alternating two dots-dashed line)

of a left end 43c and a right end 43d of the electronic rear-view mirror image region 43, is set to be positioned above the lower end (lower side) 43b of the electronic rear-view mirror image region 43.

In this manner, it is possible to achieve both a high-definition display for an electronic rear-view mirror and a wide-range display of the area near the ground for confirming a rear side by one camera and to display a right-left direction in a wider range.

Note that, since the optical distortion increases toward the outside of the low-resolution region 42, it is preferable that the display control unit 320 corrects optical distortion by performing geometric deformation processing and then displays the image.

Figure 4D:
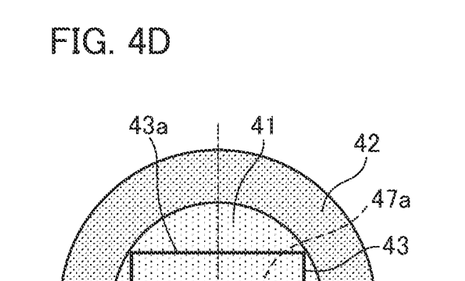

Further, in the example of FIG. 4(D), an upper end 47a of a rear-view monitor image region 47 is set to be positioned on or above a horizontal line 48 (or the horizon) on a captured image.

Such settings are more desirable because it makes it easier for the driver to ascertain the sense of distance behind the vehicle.

Further, in the examples of FIGS. 4(A) to 4(D), the upper ends 44a, 45a, 46a, and 47a of the respective rear-view monitor image regions 44, 45, 46, and 47 are set to be positioned below the upper end 43a of the electronic rear-view mirror image region 43 and positioned above the lower end 43b of the electronic rear-view mirror image region 43.

That is, a first image and a second image are generated such that the upper end of the second region is positioned between the upper end and the lower end of the first region. Thus, the electronic rear-view mirror image region 43 and the rear-view monitor image regions 44 to 47 partially overlap each other, and the same subject is displayed behind the vehicle on the first display unit 4 and the second display unit 5.

Thereby, it is possible to obtain a further effect that the driver can more easily ascertain the sense of distance behind the vehicle in a displayed image of each of the first display unit 4 and the second display unit 5.

Furthermore, in the examples of FIGS. 4(A) to 4(D), right ends of the rear-view monitor image regions 44 to 47 are set to be positioned on the right side of the right end of the electronic rear-view mirror image region 43, and left ends of the rear-view monitor image regions 44 to 47 are set to be positioned on the left side of the left end of the electronic rear-view mirror image region 43.

That is, the image generation unit generates the first image and the second image so that the left ends of the rear-view monitor image regions 44 to 47 as a second region are positioned on the left side of the left end of the electronic rear-view mirror image region 43 as a first region, and the right end of the second region is positioned on the right side of the right end of the first region.

In this manner, it is possible to achieve both a high-definition display for an electronic rear-view mirror and a wide-range display of the vicinity of the ground for confirming a rear side by one camera and to display a right-left direction in a display for the rear-view monitor in a wider range.

As described above, in the first embodiment, the image generation unit generates a first image and a second image so that at least a portion of a lower end of a second region is positioned below a lower end of a first region, and at least a portion of an upper end of the second region is positioned below an upper end of the first region. Thus, an area around the ground can be displayed in a larger size with higher definition than in the related art.

Note that, in the first embodiment, a case where the electronic rear-view mirror image region 43 and the rear-view monitor image regions 44 to 47 are individually displayed on the first display unit 4 and the second display unit 5, respectively, has been described as an example. However, the display method is not limited thereto as long as the electronic rear-view mirror image region 43 and the rear-view monitor image region 44 satisfying the above-mentioned cut-out conditions can be presented to the driver.

For example, a configuration in which the display control unit 320 synthesizes images cut out from the electronic rear-view mirror image region 43 and the rear-view monitor image regions 44 to 47 so as to be lined up, and displays the images only on one of the first display unit 4 and the second display unit 5 may be adopted.

Further, a configuration in which images cut out from the electronic rear-view mirror image region 43 and the rear-view monitor image regions 44 to 47 are selectively switched and displayed on only one of the first display unit 4 and the second display unit 5 may be adopted.

Further, a configuration in which the CPU 330 acquires information regarding whether a driving gear of the vehicle 1 is set to be a back gear through the communication unit 360 may be adopted. In addition, a configuration in which images cut out from the rear-view monitor image regions 44 to 47 are displayed on either the first display unit 4 or the second display unit 5 only when it is determined that the driving gear is set to be in the back gear may be adopted.

Second Embodiment

Next, a second embodiment will be described. The second embodiment is different from the first embodiment in that an image processing unit 3 changes the size of a cut-out region of an image to be output according to a vehicle control state.

Note that an imaging unit 2, an image processing unit 3, a first display unit 4, a second display unit 5, and their internal configurations in the second embodiment are the same as those in the first embodiment, and thus the description thereof will be omitted.

Figure 5:
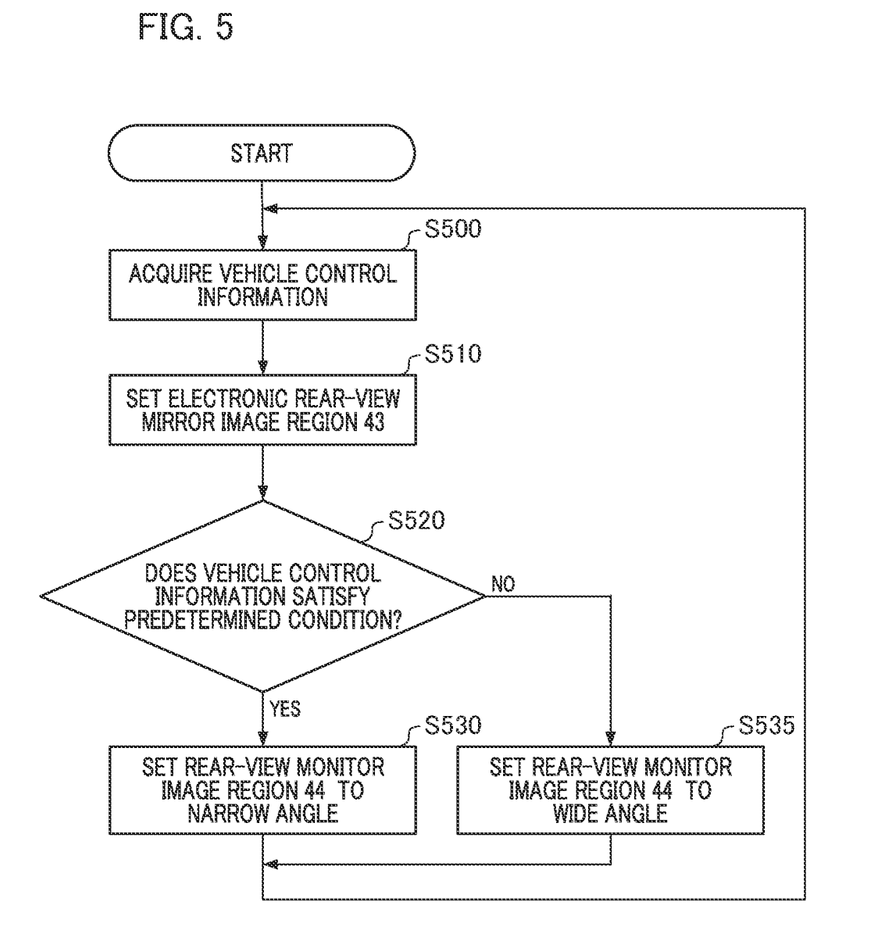
FIG. 5 is a flowchart illustrating a processing flow of a camera system in a second embodiment.

FIG. 5 is a flowchart illustrating a processing flow of a camera system in the second embodiment. Note that operations of steps in FIG. 5 are performed by causing a CPU 330 as a computer to execute a computer program stored in a ROM 350 as a memory.

In step S500 of FIG. 5, the CPU 330 acquires vehicle control information from a vehicle control device (not illustrated) that performs vehicle driving control and is mounted on a vehicle 1 via a communication unit 360. In the second embodiment, for example, traveling speed information in a vehicle back-upback-up direction is acquired.

Next, in step S510, the CPU 330 determines an electronic rear-view mirror image region 43, and sets the electronic rear-view mirror image region 43 by outputting region information to a first image generation unit 311. The electronic rear-view mirror image region 43 is set, for example, within the range of a high-resolution region 41 of FIG. 4(A) in the same manner as in the first embodiment.

Next, in step S520, the CPU 330 determines whether or not the vehicle control information acquired in step S500 satisfies a predetermined condition. In a case where it is determined that the condition is satisfied, the processing proceeds to step S530, and in a case where it is determined that the condition is not satisfied, the processing proceeds to step S535.

Specifically, in the second embodiment, it is determined whether or not a traveling speed in the vehicle back-upbackup direction is less than a predetermined value, based on the traveling speed information acquired in step S500.

In a case where the CPU 330 determines that the traveling speed is less than the predetermined value, the CPU 330 causes the processing to proceed to step S530. On the other hand, in a case where the CPU 330 determines that the traveling speed in the vehicle back-up direction is equal to or greater than the predetermined value, the CPU 330 causes the processing to proceed to step S535.

Next, in step S530, the CPU 330 selects, for example, a rear-view monitor image region 44 having a narrow angle as illustrated in FIG. 4(A) as a rear-view monitor image region, and sets the rear-view monitor image region 44 by outputting region information to a second image generation unit 312.

However, at least a portion of an upper end 44a and at least a portion of a lower end 44b of the rear-view monitor image region 44 are set so as to be positioned below an upper end 43a and a lower end 43b of the electronic rear-view mirror image region 43, respectively.

In step S535, the CPU 330 determines the rear-view monitor image region 44 to have a wider angle, and sets the region by outputting region information to the second image generation unit 312. That is, the region is set to be a wide-angle region in which a cut-out range is made relatively wider than that of the rear-view monitor image region 44 determined by the CPU 330 in step S530.

Then, the first image and the second image generated by the image generation step including steps S510, S530, S535 and the like are output from a display control unit 320 to a display unit for display (Output step).

As described above, the image generation unit is characterized in that a second region is changed according to vehicle state information.

That is, the second region is set to be, for example, the rear-view monitor image region 47 illustrated in FIG. 4(D). The upper end 47a of the rear-view monitor image region 47 in FIG. 4(D) extends above the upper end 44a of the rear-view monitor image region 44 of FIG. 4(A) which is set in step S330.

Note that, in the second embodiment, a left end, a right end, and a lower end of the rear-view monitor image region 47 are the same as those of, for example, the rear-view monitor image region 44.

When the processing of step S530 or step S535 is completed, the CPU 330 returns to step S500 and repeats the processing of steps S500 to S535 in the same manner.

As described above, by causing the CPU 330 to execute the processing from steps S500 to S535, a display mode can be appropriately changed so that a more important range can be confirmed according to a vehicle control state.

That is, in a case where the traveling speed of the vehicle during back-up is higher than a predetermined value, the vehicle travels a long distance in a short period of time, and thus the driver needs to confirm safety in a wider range or at a longer distance.

Consequently, in a case where it is determined in step S520 that the vehicle speed is higher than the predetermined value, a rear-view monitor image region 47 having a wider angle is displayed in step S535.

Thus, an upper end 47a of the rear-view monitor image region 47 has an angle of view extending above the upper end 44a of the rear-view monitor image region 44 when the traveling speed is relatively low, and thus the driver can confirm an obstacle in a wider range or at a longer distance and travel more safely.

On the other hand, in a case where the traveling speed of the vehicle is relatively low, the driver needs to confirm white lines for car stop and a parking area on a displayed image. Consequently, in a case where it is determined in step S520 that the vehicle speed is less than the predetermined value, the lower rear-view monitor image region 44 of which the upper end 44a is positioned below the upper end 47a of the rear-view monitor image region 47 in a case where the traveling speed is high is set in step S530.

Thereby, an area near the ground is displayed in an enlarged manner, and thus the driver can more easily confirm white lines for car stop and a parking area, and the like.

As described above, in the second embodiment, a high-definition display for an electronic rear-view mirror and a w-ide-range display of the vicinity of the ground for confirming a rear side are acquired at the same time by one camera, and a cut-out region of an image to be output in accordance with a vehicle control state is changed.

Further, it is determined whether or not a vehicle traveling speed is higher than a predetermined traveling speed based on traveling speed information of the vehicle included in vehicle state information, and an upper end of a second region in a case where it is determined that the vehicle traveling speed is higher than the predetermined traveling speed is positioned above an upper end of the second region in a case where it is not determined that the vehicle traveling speed is higher than the predetermined traveling speed. Thus, the driver can easily confirm a more important range in accordance with a vehicle control state.

Note that, control may be performed so that a second image is output from the output unit in a case where it is determined that the vehicle is backing up based on vehicle moving direction information included in the vehicle state information, and the second image is not output from the output unit in a case where it is not determined that the vehicle is backing up.

Note that, although a case where speed information is used as the vehicle control state has been described as an example in the second embodiment, for example, the CPU 330 may acquire obstacle information around the vehicle from the imaging unit 2 or another sensor and set the range of a cut-out region based on the obstacle information.

Specifically, in a case where an obstacle is detected behind the vehicle 1 by the imaging unit 2 or another sensor and it is determined that there is an obstacle, the rear-view monitor image region 44 is expanded such that the obstacle is included in the rear-view monitor image region 44.

Further, in a case where it is determined that there is no obstacle, the rear-view monitor image region 44 is set to have a narrow angle condition and the vicinity of the ground is displayed with high definition. That is, in a case where it is determined that there is an obstacle based on obstacle information around the vehicle included in the vehicle state information, it is more preferable that the second region is made larger so as to include the obstacle than in a case where it is determined that there is no obstacle.

Note that, in a case where a distance sensor such as a LiDAR, a sonar, a radar, or a TOF is mounted on the vehicle 1 as another sensor for detecting an obstacle, and an object is detected at a position closer than a predetermined distance, it may be determined that there is an obstacle.

Further, a configuration in which object detection is performed based on a result obtained by performing image recognition on image data obtained from the imaging unit 2 may be adopted, and a configuration in which it is determined that there is an obstacle in a case where a predetermined type of object such as a person has been detected may be adopted.

Further, in a case where an obstacle is moving, the moving speed and direction thereof may be detected from an image, and as the moving speed of the obstacle increases, the second region may be extended in the direction of the moving speed. With such a configuration, the vehicle can travel more safely.

Note that a vehicle in the above-described embodiment is not limited to, for example, an automobile, and may be any device as long as the vehicle is the moving device such as a ship, an airplane, a robot, or a drone, and includes them. In addition, the second embodiment can also be applied when the vehicle is controlled remotely.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the camera system through a network or various storage media. Then, a computer (or a CPU, an MPU, or the like) of the camera system may be configured to read and execute the program. In such a case, the program and the storage medium storing the program configure the present invention.

This application claims the benefit of Japanese Patent Application No. 2021-155237 filed on Sep. 24, 2021, which is hereby incorporated by reference herein in its entirety.

What is claimed is:

1. A camera system comprising:
an imaging unit that acquires a captured image of a rear of a vehicle;
an optical system that forms an optical image having a high-resolution region and a low-resolution region on the imaging unit;
at least one processor or circuit configured to function as:
an image generation unit configured to generate a first image by cutting out a first region from an image region corresponding to the high-resolution region in an image data read from the imaging unit and generate a second image by cutting out a second region from an image region different from the first region; and
an output unit configured to output at least one of the first image and the second image for display,
wherein the image generation unit generates the first image and the second image so that at least a portion of a lower end of the second region is positioned below a lower end of the first region, and at least a portion of an upper end of the second region is positioned below an upper end of the first region.

2. The camera system according to claim 1, wherein the image generation unit generates the first image and the second image so that the entire lower end of the second region is positioned below the lower end of the first region, and the entire upper end of the second region is positioned below the upper region.

3. The camera system according to claim 1, wherein the image generation unit generates the first image and the second image so that a left end of the second region is positioned on a left side of a left end of the first region, and a right end of the second region is positioned on a right side of a right end of the first region.

4. The camera system according to claim 1, wherein the image generation unit generates the first image and the second image so that the upper end of the second region is positioned between the upper end and the lower end of the first region.

5. The camera system according to claim 1, wherein the image generation unit generates the first image and the second image so that the upper end of the second region is positioned on or above a horizon in the captured image.

6. The camera system according to claim 1, wherein, when a focal length of the imaging unit is f, a half angle of view is $\theta$, an image height on an image surface is y, and a projection characteristic representing a relationship between the image height y and the half angle of view $\theta$ is $y(\theta)$, $y(\theta)$ in the high-resolution region is larger than $f \times \theta$, which is different from a projection characteristic in the low-resolution region.

7. The camera system according to claim 6, wherein the high-resolution region is configured to have a projection characteristic close to a central projection method ($y = f \times \tan\theta$) or an equidistant projection method ($y = f \times \theta$).

8. The camera system according to claim 6, wherein, when $\theta$ max is a maximum half angle of view of the optical system, and A is a predetermined constant, the camera system is configured to satisfy the following equation $$1 < \frac{f \times \sin\theta_{max}}{y(\theta_{max})} \leq A.$$

9. The camera system according to claim 1, wherein the output unit outputs the first image without geometric deformation processing, but the second image with a predetermined geometric deformation processing.

10. The camera system according to claim 1, further comprising:
at least one processor or circuit configured to function as:
a communication unit configured to acquire state information of the vehicle,
wherein the image generation unit changes at least the second region according to the state information of the vehicle.

11. The camera system according to claim 10, wherein the image generation unit determines whether or not a vehicle traveling speed is higher than a predetermined traveling speed based on traveling speed information of the vehicle which is included in the state information of the vehicle, and sets the upper end of the second region in a case where it is determined that the vehicle traveling speed is higher than the predetermined traveling speed to be positioned above the upper end of the second region in a case where it is not determined that the vehicle traveling speed is higher than the predetermined traveling speed.

12. The camera system according to claim 10, wherein, in a case where it is determined that there is an obstacle based on obstacle information around the vehicle which is included in the state information of the vehicle, the image generation unit makes the second region larger than in a case where it is determined that there is no obstacle, so that the second region includes the obstacle in the second region.

13. The camera system according to claim 10, wherein the image generation unit outputs the second image from the output unit in a case where it is determined that the vehicle is backing up based on moving direction information of the vehicle included in the state information of the vehicle, and does not output the second image from the output unit in a case where it is not determined that the vehicle is backing up.

14. A vehicle comprising:
- an imaging unit that acquires a captured image of a rear of a vehicle;
- an optical system that forms an optical image having a high-resolution region and a low-resolution region on the imaging unit;
- at least one processor or circuit configured to function as:
- an image generation unit configured to generate a first image by cutting out a first region from an image region corresponding to the high-resolution region in an image read from the imaging unit and generate a second image by cutting out a second region from an image region different from the first region; and
- an output unit configured to output at least one of the first image and the second image for display,
- wherein the image generation unit generates the first image and the second image so that at least a portion of a lower end of the second region is positioned below a lower end of the first region, and at least a portion of an upper end of the second region is positioned below an upper end of the first region, and
- the vehicle includes at least one processor or circuit configured to function as:
- a display unit configured to display at least one of the first image and the second image output from the output unit.

15. A control method for controlling a camera system that includes an imaging unit that acquires a captured image of a rear of a vehicle,
- an optical system that forms an optical image having a high-resolution region and a low-resolution region on the imaging unit,
- the control method comprising:
- generating a first image by cutting out a first region from an image region corresponding to the high-resolution region in an image read from the imaging unit and generate a second image by cutting out a second region from an image region different from the first region; and
- outputting at least one of the first image and the second image for display,
- wherein the generating of the first image and the second image includes generating the first image and the second image so that at least a portion of a lower end of the second region is positioned below a lower end of the first region, and at least a portion of an upper end of the second region is positioned below an upper end of the first region.

16. A non-transitory computer-readable storage medium configured to store a computer program for causing a camera system to execute steps, the camera system including an imaging unit that acquires a captured image of a rear of a vehicle,
- an optical system that forms an optical image having a high-resolution region and a low-resolution region on the imaging unit,
- the steps comprising:
- generating a first image by cutting out a first region from an image region corresponding to the high-resolution region in an image read from the imaging unit and generating a second image by cutting out a second region from an image region different from the first region; and
- outputting at least one of the first image and the second image for display,
- wherein the generating of the first image and the second image includes generating the first image and the second image so that at least a portion of a lower end of the second region is positioned below a lower end of the first region, and at least a portion of an upper end of the second region is positioned below an upper end of the first region.

\* \* \* \* \*